Patented Sept. 30, 1941

2,257,607

UNITED STATES PATENT OFFICE 2,257,607

POLYSULPHIDE FILM-FORMING MATERIAL AND PROCESS FOR PREPARING THE SAME

Fritz Jage, Saarau, Kreis Schweidnitz, Germany, assignor to the firm Silesia Verein Chemischer Fabriken, Saarau, Kreis Schweidnitz, Germany No Drawing. Application December 14, 1939, Serial No. 309,239. In Germany December 31, 1938

2 Claims. (Cl. 260—32)

The present invention relates to a film-forming material and a process for preparing the same, and it has particular relation to the production of such material from sulphur-containing, organic condensation products of high molecular weight.

A further object of my invention is the use of said film-forming material for the preparation of coatings, impregnations, cementing layers, or the like.

It is known that highly polymerized rubber-like condensation products, which contain sulphur, can be obtained by causing a reaction of an inorganic water-soluble polysulphide with an organic compound containing replaceable negative groups, such as dihalogenated paraffin hydrocarbons. By carrying out this reaction in an aqueous medium in the presence of an inorganic dispersing agent, such as magnesium hydroxide, and, if desired, with the simultaneous use of an organic protective colloid substance, the condensation product is obtained in the form of a finely divided latex-like suspension in water. This finely divided product is washed with water, coagulated with acid, and, by a treatment on rolls, is converted into rubber-like sheets which are used for the production of soft rubber-like articles.

It is also known that the condensation products thus obtained show an extraordinary resistance to organic solvents. They neither dissolve nor swell in most of the organic liquids, and they have found numerous applications owing to their stability when in contact with organic solvents. A general application of these products was, however, prevented hitherto precisely because of their stability to such solvents, as the production of articles from these products was limited to the use and working of the solid material obtained by coagulation. It was not possible to use said condensation products for the production of coatings or impregnations in the form of solutions, or as pastes or cements capable of being spread.

The above mentioned aqueous, latex-like suspensions of the sulphur-containing condensation products can not be used for the production of coatings or the like, as such suspensions do not yield coherent coatings or films when dried at ordinary or elevated temperatures. By drying such suspensions, cracked non-coherent products of poor adhesive power are obtained which are neither sufficiently waterproof, nor resistant to acids or free from pores.

I have found that a suspension of the above-mentioned sulphur-containing condensation products, which forms a coherent, homogeneous film on drying and can be used as a valuable coating, impregnating or adhesive composition, can be prepared by proceeding as follows:

An aqueous suspension of an organic polysulphide is produced in a known manner by causing a reaction between a water-soluble inorganic polysulphide and an organic compound containing replaceable negative groups, in the presence of a dispersing agent, and washing the product obtained. The suspension is then cautiously mixed with an aqueous diluted acid, thereby avoiding coagulation, until a pH-value of 4–6.5 is attained. After this treatment with acid, a neutralizing agent, such as aqueous, diluted ammonia is added, until the pH-value is increased to 7–8. The suspension is then washed by decanting it several times with water. I have found that coagulation of the suspension, as a rule, does not take place during acidulation up to pH=4. I prefer, however, not to go beyond pH=6 in order to avoid any unnecessary consumption of acid and neutralizing agent. I have found that the addition of the neutralizing agent is necessary, as otherwise coagulation of the acidulated suspension easily occurs during washing.

Example.—An aqueous suspension is prepared in a known manner from the condensation product of ethylene chloride and sodium tetrasulphide in the presence of magnesium hydroxide as a dispersing agent. Such a condensation product of high molecular weight is, for example, obtained by the condensation of 460 parts by weight of ethylene chloride and 3980 parts by weight of an aqueous solution containing 860 parts by weight of sodium tetrasulphide. Condensation is carried out in the presence of 15 parts by weight of freshly precipitated magnesium hydroxide. The suspension obtained in a known manner has a dry content of about 12%, and about 2% ashes, calculated on the dry content. 1200 grams of this suspension are gradually mixed under thorough stirring at room temperature with 40 cc. 2N aqueous hydrochloric acid. After the addition of the acid, the suspension shows a pH=6. 10 cc. of a .2N aqueous ammonia solution are then added drop by drop, whereby the pH-value of the suspension rises to 7.5. The suspension is allowed to settle; the liquid, which remains above the condensation product, is removed, and the condensation product is washed by decanting it twice with 1000 cc. water each time. The latex-like dispersion thus obtained shows the above-mentioned film-forming capability; it contains only about .5% ash, calculated on the dry content. This dispersion can be used for preparing coatings or impregnations, and yields on drying valuable, coherent, homogeneous and highly resistant films or the like.

In carrying out my present invention, a dispersion of any highly polymerized sulphur-containing organic condensation product obtained by means of an inorganic dispersing agent, may be used. Instead of ethylene chloride, other organic compounds, which are capable of reacting with inorganic polysulphides at least at two linkages, can be used. Suitable organic compounds are, for example, dihalogenated hydrocarbons, dihalogenated ethers, esters, and acetals, alkyl dithiosulphuric acids, such as ethyl-dithiosulphuric acids, alkyl dimercaptans, such as ethyl dimercaptans. Mixtures of several organic compounds may also be used. As examples for inorganic dispersing agents, beside magnesium hydroxide, hydroxides of calcium, barium, or their oxides or carbonates, or mixtures of these substances may be mentioned.

In the treatment of the suspensions according to my invention, instead of hydrochloric acid other acids, except those which have an oxidizing effect, such as nitric acid or chromic acid, may be used. Diluted sulphuric acid, fluosilicic acid, acetic acid, or formic acid may, for example, be employed. In the present specification and claims the term "non-oxidizing acid" includes all these acids except those having an oxidizing effect. Other neutralizing agents, such as alkali hydroxides or basic salts, may be substituted for aqueous ammonia. In carrying out the process of my invention I prefer the use of acids and basic neutralizing agents which form water-soluble compounds.

The products obtained from the material prepared according to my present invention, show valuable chemical and physical properties. They are highly impermeable to water, and to aqueous solutions of acids, such as concentrated hydrochloric acid. They also show an extraordinary resistance to organic substances, and do not dissolve or swell when subjected to the action of aliphatic and aromatic hydrocarbons, motor fuel, solvents, oils, etc. They possess a high resistance to aging and atmospheric influences, and are inert to ozone. Thus, the products obtained according to my invention show essentially the same valuable properties as the plastic products obtained from aqueous suspensions of the sulphur containing organic condensation products by coagulating said suspensions with an acid.

By the process of my invention latex-like suspensions can be obtained which yield coatings, impregnations, cementing layers, or the like, having the above mentioned valuable properties. The suspensions can be used without any admixture or with the addition of other materials, such as fillers, pigments, etc. Furthermore, the suspensions can be subjected to a solidifying heat treatment with or without the addition of other substances in a similar manner to that already known in the treatment of highly polymerized, rubber-like, sulphur-containing condensation products. Such heat treatment is described, for example, in the U. S. Patent No. Re. 19,207 to Patrick, page 2, lines 61–64.

I claim:

1. A process for producing an aqueous dispersion of a sulphur-containing organic condensation product of high molecular weight, which comprises the steps of forming an aqueous dispersion by condensing an inorganic water-soluble polysulphide in an aqueous reaction medium with an organic compound having a substituent joined to each of two different carbon atoms, which substituent is split off during the reaction, in the presence of an inorganic dispersing agent selected from the group consisting of an oxide, hydroxide and carbonate of magnesium, calcium and barium, adding to the aqueous dispersion thus obtained, in immediate succession, a diluted, non-oxidizing acid until a pH-value of 4–6.5 is attained, and then a basic neutralizing agent until the pH-value rises to 7–8, and then washing the dispersion thus obtained with water.

2. A stable aqueous dispersion obtained by the process according to claim 1, said dispersion containing about 0.5% ash, calculated on the dry content, having a pH-value of 7–8, being capable of forming, when dried, coherent, homogeneous films and coatings which are impermeable to water, and highly resistant to acids and organic solvents.

FRITZ JAGE.